US012614201B1

(12) United States Patent
Medina, III et al.

(10) Patent No.: US 12,614,201 B1
(45) Date of Patent: Apr. 28, 2026

(54) GUIDANCE SYSTEMS AND METHODS FOR SUPPLY CHAIN ISSUES

(71) Applicant: United Services Automobile Association (USAA), San Antonio, TX (US)

(72) Inventors: Reynaldo Medina, III, San Antonio, TX (US); Oscar Guerra, San Antonio, TX (US); Bradly Jay Billman, Celina, TX (US); Arthur Quentin Smith, Fredericksburg, TX (US); Qunying Kou, San Antonio, TX (US); Breanna Nicole Allerkamp, Boerne, TX (US); Daniel Diaz, San Antonio, TX (US); Justin Royell Nash, Little Elm, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 156 days.

(21) Appl. No.: 17/899,742

(22) Filed: Aug. 31, 2022

Related U.S. Application Data

(60) Provisional application No. 63/238,992, filed on Aug. 31, 2021.

(51) Int. Cl.
*G06Q 30/0202* (2023.01)
*G06Q 10/0631* (2023.01)
*G06Q 30/0204* (2023.01)

(52) U.S. Cl.
CPC ... *G06Q 30/0202* (2013.01); *G06Q 10/06315* (2013.01); *G06Q 30/0205* (2013.01)

(58) Field of Classification Search
CPC ......... G06Q 30/0202; G06Q 10/06315; G06Q 30/0205
See application file for complete search history.

(56) References Cited

U.S. PATENT DOCUMENTS

| | | | | | |
|---|---|---|---|---|---|
| 8,639,620 | B1 * | 1/2014 | Billman | .............. | G06Q 20/105 |
| | | | | | 705/41 |
| 11,348,156 | B2 * | 5/2022 | Langdon | ............ | G06Q 30/0205 |
| 11,521,143 | B2 * | 12/2022 | Smith | .................... | G06N 20/00 |
| 2002/0072988 | A1 * | 6/2002 | Aram | ................. | G06Q 30/0601 |
| | | | | | 705/26.1 |

(Continued)

OTHER PUBLICATIONS

McGurran, Brianna. How to Negotiate a Lower Interest Rate on Your Credit Card. https://www.experian.com/blogs/ask-experian/can-i-negotiate-a-lower-interest-rate-on-my-credit-card/. (Year: 2020).*

*Primary Examiner* — Patricia H Munson
(74) *Attorney, Agent, or Firm* — Fletcher Yoder, P.C.

(57) ABSTRACT

A guidance system includes one or more processors and memory storing instructions executable by the one or more processors to cause the one or more processors to receive data from multiple data sources, receive a geographic location associated with a user device, and to identify a forecast of an event for the geographic location based on the data. The instructions are executable by the one or more processors to cause the one or more processors to, in response to identifying the forecast of the event for the geographic location and based on the data, predict an occurrence of one or more supply chain shortages of one or more items in an area associated with the geographic location.

17 Claims, 3 Drawing Sheets

(56) References Cited

U.S. PATENT DOCUMENTS

| | | | |
|---|---|---|---|
| 2003/0110104 A1* | 6/2003 | King | G06Q 10/087 |
| | | | 705/28 |
| 2014/0058775 A1* | 2/2014 | Siig | G06Q 10/06 |
| | | | 705/7.12 |
| 2014/0207550 A1* | 7/2014 | Eden | G06Q 20/22 |
| | | | 705/14.23 |
| 2015/0185034 A1* | 7/2015 | Abhyanker | G05D 1/0088 |
| | | | 701/23 |
| 2016/0034925 A1* | 2/2016 | Unser | G06Q 30/0202 |
| | | | 705/7.31 |
| 2016/0063597 A1* | 3/2016 | Goulart | G06Q 50/01 |
| | | | 705/26.7 |
| 2016/0092830 A1* | 3/2016 | Goulart | H04W 4/021 |
| | | | 705/28 |
| 2017/0147976 A1* | 5/2017 | Koch | G06Q 10/0833 |
| 2017/0308915 A1* | 10/2017 | Jones | G06Q 30/0202 |
| 2020/0074402 A1* | 3/2020 | Adato | G06V 20/52 |
| 2020/0265506 A1* | 8/2020 | Sablak | G06Q 30/0641 |
| 2022/0215332 A1* | 7/2022 | Kwok | G06Q 10/087 |
| 2022/0358443 A1* | 11/2022 | Deng | G06Q 10/0875 |
| 2023/0385752 A1* | 11/2023 | Choudhury | G06F 16/29 |

* cited by examiner

GUIDANCE SYSTEMS AND METHODS FOR SUPPLY CHAIN ISSUES

CROSS-REFERENCE TO RELATED APPLICATION

The present application claims priority to and the benefit of U.S. Provisional Application No. 63/238,992, entitled "SYSTEMS AND METHODS FOR DETECTING SUPPLY CHAIN SHORTAGES IN SEVERE EVENTS" and filed on Aug. 31, 2021, the disclosure of which is incorporated by reference herein in its entirety for all purposes.

BACKGROUND

This section is intended to introduce the reader to various aspects of art that may be related to various aspects of the present techniques, which are described and claimed below. This discussion is believed to be helpful in providing the reader with background information to facilitate a better understanding of the various aspects of the present disclosure. Accordingly, it should be noted that these statements are to be read in this light, and not as admissions of prior art.

Severe events (e.g., natural disasters, weather, fire, riots, government lockdowns, infrastructure outages) may cause supply chain shortages. Furthermore, lack of access to supplies caused by supply chain shortages in severe events may be detrimental (e.g., to people, buildings, vehicles). Thus, it is presently recognized that it would be desirable to detect and/or to predict supply chain shortages and to facilitate access to supplies affected by supply chain shortages during severe events.

SUMMARY

Certain embodiments commensurate in scope with the present disclosure are summarized below. These embodiments are not intended to limit the scope of the disclosure, but rather these embodiments are intended only to provide a brief summary of possible forms of present embodiments. Indeed, present embodiments may encompass a variety of forms that may be similar to or different from the embodiments set forth below.

In one embodiment, a guidance system includes one or more processors and memory storing instructions executable by the one or more processors to cause the one or more processors to receive, via a network, data from multiple data sources. The instructions are executable by the one or more processors to cause the one or more processors to receive, via the network, a geographic location associated with a user device. The instructions are executable by the one or more processors to cause the one or more processors to identify, based on the data, a forecast of an event for the geographic location. The instructions are executable by the one or more processors to cause the one or more processors to, in response to identifying the forecast of the event for the geographic location and based on the data, predict an occurrence of one or more supply chain shortages of one or more items in an area associated with the geographic location. The instructions are executable by the one or more processors to cause the one or more processors to, in response to identifying the forecast of the event for the geographic location, generate an output that includes an indication of the event and the one or more supply chain shortages, and also to send, via the network, the output to the user device.

In one embodiment, a method of operating a guidance system includes receiving, at one or more processors, data from multiple data sources. The method also includes receiving, at the one or more processors, a geographic location associated with a user device. The method also includes identifying, using the one or more processors and based on the data, a forecast of an event for the geographic location. The method further includes, in response to identifying the forecast of the event for the geographic location, predicting, using the one or more processors and based on the data, an occurrence of one or more supply chain shortages of one or more items in an area associated with the geographic location. In response to identifying the forecast of the event for the geographic location, the method further includes generating, using the one or more processors, an output that includes an indication of the event and the one or more supply chain shortages; identifying the forecast of the event for the geographic location; and instructing, using the one or more processors, display of the output on the user device.

In one embodiment, a guidance system includes one or more processors and memory storing instructions executable by the one or more processors to cause the one or more processors to receive weather data from a weather data source. The instructions are executable by the one or more processors to cause the one or more processors to receive a geographic location associated with a user device. The instructions are executable by the one or more processors to cause the one or more processors to identify, based on the weather data, a forecast of a weather event for the geographic location. The instructions are executable by the one or more processors to cause the one or more processors to receive additional data from one or more additional data sources, wherein the additional data includes purchase data from a banking service of the one or more additional data sources, image data from a camera of the one or more additional data sources, or a combination thereof. The instructions are executable by the one or more processors to cause the one or more processors to predict, based on the additional data, an occurrence of one or more supply chain shortages of one or more items in an area associated with the geographic location. The instructions are executable by the one or more processors to cause the one or more processors to instruct output of an indication of the one or more supply chain shortages via a user device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
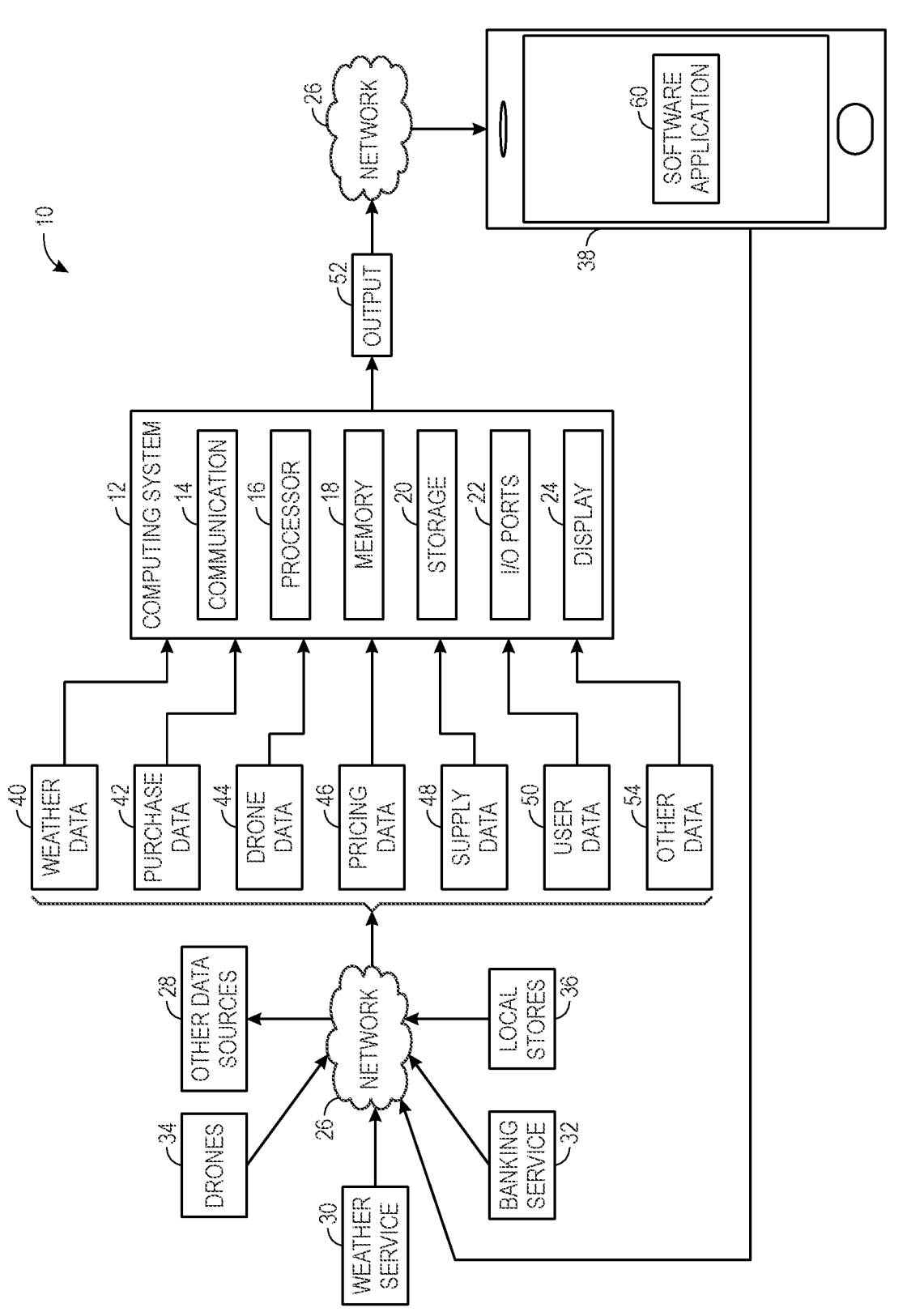
FIG. 1 illustrates a block diagram of a system that is configured to detect and/or to predict supply chain shortages associated with a severe event, in accordance with an embodiment described herein.

One or more specific embodiments will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Present embodiments are directed to guidance systems (e.g., an electronic mapping system) configured to provide guidance for consumers and/or providers. The guidance may include driving directions on a mapping application, recommendations for purchasing, and the like.

Severe events (e.g., natural disasters, ice storms, winter storms, heavy snow or rain, hurricanes, floods, fires, riots, power grid failures, communications network failures, transportation interruptions, government lockdowns) may cause supply chain shortages. In particular, supplies (e.g., gasoline, generators, home repair supplies, water, food) may run in short supply as demand rises in line with the approach of the severe event, during the severe event, and/or after the severe event. Lack of access to these supplies may be detrimental (e.g., to people, buildings, vehicles). For example, in a winter storm, lack of access to generators or gasoline to fuel the generators may force people to endure low temperatures for long periods of time. As another example, in heavy rain, lack of access to tarps to cover damage to a roof of a building may result in water damage to an interior of the building.

It is presently recognized that it may be beneficial to notify users of current and/or expected supply chain shortages. With such knowledge, a user may be able to stock up on supplies before the severe event. Additionally, it may be beneficial to notify users of availability of supplies during supply chain shortages. With such knowledge, the user may be able to travel to a store that has a certain item in stock. Furthermore, it may be beneficial to enable users to coordinate with one another to obtain supplies. For example, a first user (e.g., recipient user) who is unable to travel during a severe weather event and/or who is unable to obtain a certain item from a store may communicate with a second user (e.g., supplier user) to arrange delivery of supplies (e.g., the certain item) from the second user to the first user.

With the foregoing in mind, in certain embodiments, a computing system may use data from one or more data sources to determine and/or to predict occurrence of a supply chain shortage associated with a severe event (e.g., determine existence at a current time and/or predict occurrence at a future time). For example, the computing system may receive data from a weather service, a banking service, one or more drones, one or more stores (e.g., store systems), and/or one or more user devices (e.g., mobile devices) via a network. The data may include weather data, purchase data, drone data, pricing data, and/or supply data. In response to determining and/or predicting the occurrence of the supply chain shortage associated with the severe event, the computing system may generate an output (e.g., a notification) for one or more users (e.g., via the one or more user devices). The notification may contain information, such as a time at which the severe event is expected to occur, what supplies are likely to have a shortage, where to obtain the supplies that are likely to have a shortage, and the like.

In some embodiments, the computing system may be configured to adjust (or to recommend adjustment of) financial or banking parameters to facilitate purchase of the supplies for a period of time, which may be prior the severe event, during the severe event, and/or after the severe event. For example, the period of time may be 2, 3, 4, 5, 6, 7, or more days, and the period of time may include at least some days prior to the severe event and/or at least some days after the severe event. In particular, to facilitate the purchase of the supplies, the computing system may adjust (e.g., increase) an allowable purchase limit (e.g., daily purchase limit or a total credit limit) for the one or more users and/or may adjust (e.g., decrease) an annual percentage rate (APR) for the one or more users at least for certain items, certain types of items, and/or certain stores. For example, the adjustments to the allowable purchase limit and/or the APR may apply to generators, gasoline, food, water, and/or building supplies. As another example, the adjustments to the allowable purchase limit and/or the APR may apply to generator supply stores, gas stations, grocery stores, and/or building supply stores. Then, the output may indicate the adjustments to the allowable purchase limit and/or the APR. In such cases, the computing system may communicate with the banking service and/or may be considered to include the banking service.

The computing system may be configured to facilitate user collaboration for the provision of supplies during the severe event. In some embodiments, the computing system may receive availability data from user devices of users (e.g., supplier users) who wish to provide supplies to other users (e.g., recipient users). In some embodiments, the computing system may determine matches between supplier users and recipient users (e.g., based on location and/or supplies). Then, the output to the user devices of the recipient users may indicate the availability data from the supplier user(s), the one or more supplies that the supplier user(s) are able to provide, and/or the amount of the one or more supplies the matching supplier user(s) are able to provide. In addition to providing the recipient users with supplies and/or fostering a sense of community among users, the computing system may enable insurance companies and/or banking companies to aid customers (e.g., some or all of the users) during severe events. Additional details regarding systems and processes for detecting supply chain shortages during severe events will be discussed below with reference to FIGS. 1-5.

By way of introduction, FIG. 1 illustrates a block diagram of a system 10 (e.g., a guidance system; an electronic mapping system) that is configured to detect and/or to predict supply chain shortages associated with a severe event, in accordance with certain embodiments disclosed herein. As shown, a computing system 12 may be communicatively coupled to multiple data sources that provide data, such as a weather service 30 that provides weather data 40, a banking service 32 that provides purchase data 42, one or more drones 34 that provide drone data 44, one or more local stores 36 that provide pricing data 46 and/or supply data 48, and/or one or more user devices 38 that provide user data, such as availability, preferences, historic purchases, location, limitations on travel, or the like. It should be appreciated that the multiple data sources that provide data may include any of a variety of other data sources 28 that provide various other data 54, such as news sources that provide news data, advisory sources that provide event data, government sources that provide government or event data, and so forth. It should also be appreciated that the other data sources 28 may include sensors that provide sensor data, which may be used instead of or in addition to the drone data 44 to provide information about a location. For example, the sensors may be cameras that are operated via users at the location (e.g., via operation of the cameras on the one or more user devices 38) to provide images of a location, or the sensors may be cameras that are affixed at the location (e.g., security cameras at a store or traffic cameras along a highway). Furthermore, it should be appreciated that the drones 34 and/or the sensors may be automated, remote controlled, or operated in any suitable manner to collect relevant data for the techniques disclosed herein.

The data sources may send the data to the computing system 12 via a network 26 (e.g., the Internet or 5G). The computing system 12 may have a computing application that is configured to analyze the data and may generate an output 52. For example, the output 52 may be a notification that contains information, such as a time at which a severe event is expected to occur, what supplies have or are expected to have a shortage, where to obtain the supplies that are or are expected to have a shortage, and the like. In some embodiments, the output 52 may be sent to the one or more user devices 38 and/or a central site (e.g., webpage) that is accessible to users, such as via the one or more user devices 38. As discussed herein, the output 52 may also be sent to the banking service 32.

The computing system 12 may be implemented using a suitable computer device (e.g., a general-purpose personal computer, a laptop computer, a tablet computer, a mobile computer) that may execute specialized or specific executable-instructions that may cause the computing device to perform the various tasks described herein. The computing system 12 may include a communication component 14, a processor 16, a memory 18, a storage 20, input/output (I/O) ports 22, and/or a display 24. The communication component 14 may be a wireless or wired communication component that may facilitate communication between the computing system 12 and various other computing systems via the network 26.

The processor 16 may be any type of computer processor or microprocessor capable of executing computer-executable code. The processor 16 may also include multiple processors that may perform the operations described below. The memory 18 and the storage 20 may be any suitable articles of manufacture that can serve as media to store processor-executable code, data, or the like. These articles of manufacture may represent computer-readable media (e.g., any suitable form of memory or storage) that may store the processor-executable code used by the processor 16 to perform the presently disclosed techniques. The memory 18 and the storage 20 may also store data, various other software applications for analyzing the data, and the like. The memory 18 and the storage 20 may represent non-transitory computer-readable media (e.g., any suitable form of memory or storage) that may store the processor-executable code used by the processor 16 to perform various techniques described herein. It should be noted that non-transitory merely indicates that the media is tangible and not a signal.

The I/O ports 22 may be interfaces that may couple to other peripheral components, such as input devices (e.g., a keyboard, a mouse), sensors, input/output (I/O) modules, and the like. The display 24 may operate as a human machine interface (HMI) to depict visualizations associated with software or executable code being processed by the processor 16. In one embodiment, the display 24 may be a touch display capable of receiving inputs from a user of the computing system 12. The display 24 may be any suitable type of display, such as a liquid crystal display (LCD), plasma display, or an organic light emitting diode (OLED) display, for example. Additionally, in one embodiment, the display 24 may be provided in conjunction with a touch-sensitive mechanism (e.g., a touch screen) that may function as part of a control interface for the computing system 12. It should be noted that the components described above with respect to the computing system 12 are examples and the computing system 12 may include additional or fewer components. Additionally, the components listed as being part of the computing system 12 may also be components that are part of other computing devices described herein.

The computing system 12 may be connected to the network 26, which may include one or more collections of computing systems, the Internet, an intranet system, or the like. The network 26 may facilitate communications between the computing system 12, the user devices 38, and the other data sources. The network 26 may use various communication protocols to facilitate the communications. The communications protocols may include Open Database Connectivity (ODBC), TCP/IP Protocol, Distributed Relational Database Architecture (DRDA) protocol, Database Change Protocol (DCP), HTTP protocol, other suitable current or future protocols, or the like.

In FIG. 1, the one or more user devices 38 may include any of a variety of computing systems, such as smartphones, mobile tablets, laptop computers, wearable computers, implanted computers, and the like. The one or more user devices 38 may have access to the network 26 directly (e.g., through a specific virtual private network (VPN) connection) or indirectly (e.g., via a public network and with certain security protocols). In some embodiments, the one or more user devices 38 may be configured to display the output 52 as a notification on a screen (e.g., display screen). It should be appreciated that the output 52 may be a file, such as a spreadsheet, which the users can download via the one or more user devices 38. This may enable the users to access (e.g., numerous times) helpful information in a format that is easy to read, search, filter, or the like. For example, the spreadsheet may include a list of supply shortages and varying in-stock times (e.g., fuel in two days, food in one day) for various stores and/or for the area generally.

To facilitate discussion, certain examples described herein refer to a first user device 38 and/or a second user device 38, which are representative of the one or more user devices 38. In operation, the first user device 38 may utilize map data, such as from a maps application stored on the first user device 38, to determine the location of the first user device 38 (which indicates the location of the user associated with the first user device 38). The first user device 38 may utilize a satellite-based navigation system, which may include one or more of a Global Positioning System (GPS) receiver, a Global Navigation Satellite System (GLONASS) receiver, a Galileo receiver, an Indian Regional Navigational Satellite (IRNS) System receiver, and so forth. The location may also be determined through geolocation based on an internet protocol (IP) address of the first user device 38. In some cases, the location may be determined based on previously collected information describing the first user device 38, such as a previously specified address of the user's home, workplace, social network posts, or other information indicating the user's presence at a restaurant, store, or other location. In some cases, the location may be determined via direct query of the user, such as a text message that request that the user provide an input indicative of the location via the first user device 38. In some embodiments, the first user device 38 may send the location to the computing system 12 via the network 26. The other user devices 38 similarly provide their respective locations to the computing system 12 via the network 26.

The first user device 38 may be associated with and store a software application 60 (e.g., stored on the first user device 38, in the cloud, or server). The software application 60 may be managed by an owner or administrator, such as an insurance company and/or banking company. In some embodiments, the software application 60 may utilize data received at the first user device 38 (e.g., via the output 52) to display information on the screen of the first user device 38. For example, the output 52 may contain data, such as price data, supply availability data, and the like. Then, using this data, the software application 60 may display information, such as a price of a certain item at one or more stores, an amount of stock of a certain item at one or more stores, an amount of estimated time left before an item goes out of stock at one or more stores, one or more users (e.g., supplier users) who are available to provide one or more items, a distance relative to the one or more supplier users, and the like. In some embodiments, the software application 60 may facilitate communication between the first user device 38 and a second user device 38 via the network 26. That is, a first user may use the first user device 38 to coordinate with a second user who has the second user device 38 to arrange for the delivery of supplies (e.g., via an exchange of messages with the software application 60). It should be appreciated that the other user devices 38 similarly utilize the software application 60 to facilitate the techniques disclosed herein.

The computing system 12 may receive data from a variety of sources, such as the weather service 30, the banking service 32, the one or more drones 34, the one or more local stores 36, and/or the one or more user devices 38 via the network 26. The weather service 30 may provide the weather data 40. The format of the weather data 40 (and the format of data 42, 44, 46, 48, and 50) may be in the format of Comma-separated Values (CSV), JavaScript Object Notation (JSON), Extensible Markup Language (XML), Portable Network Graphic (PNG), Geostationary Earth Orbit Tagged Image File Format (GeoTIFF), HyperText Markup Language (HTML), Network Common Data Form (NetCDF), text files, Excel files, and the like. The weather data 40 may contain weather parameters, such as temperature, humidity, atmospheric pressure, wind speed, precipitation levels, and the like. The weather data 40 may also contain data pertaining to oceanic tides, tropical cyclones, weather extremes (e.g., freezes, heat waves), and the like. Particularly, the weather data 40 may indicate whether a severe weather event is imminent and/or expected for one or more geographic locations, as well as weather parameters for the severe weather event (e.g., ice, temperature, rain, snow, flood level). Further, that data may include other data related to fires (e.g., movement, size), riots (e.g., locations, size), shutdowns (e.g., locations, duration, exceptions), infrastructure (e.g., estimated time of arrival, expected duration, level, such as brown out, black out, rolling outage, slow down).

The banking service 32 may provide the purchase data 42, which may contain data pertaining to the purchase of one or more supplies by one or more users of the banking service 32. Specifically, the purchase data 42 may contain data pertaining to activity associated with payment cards (e.g., credit cards, debit cards) associated with one or more financial accounts managed by the banking service 32. That is, the data may show payment card activity, which is indicative of an amount of supplies purchased over time at various stores. The computing system 12 may use the purchase data 42 to determine and/or to predict occurrence of a supply chain shortage. For example, the computing system 12 may receive the purchase data 42 over time, and the purchase data 42 may be categorized and/or associated with one or more types of items and/or one or more local stores 36 (e.g., all of the purchase data 42 from a first gas station may be categorized as being from the first gas station; all of the purchase data 42 from all of the generator supply stores may be categorized as being related to generators and/or the generator supply stores). In some embodiments, the computing system 12 requests and/or analyzes the purchase data 42 related to purchases within the one or more geographic locations in response to data indicating that the severe event is imminent and/or expected for the one or more geographic locations. In this way, the computing system 12 limits processing tasks and operations to periods of severe events. However, it should be appreciated that any of the techniques disclosed herein to determine and/or to predict supply shortages, as well as to notify users of the supply shortages, may be carried out continuously and/or periodically and/or in response to other factors regardless of event (e.g., even in the absence of any expected severe event) to assist users.

During periods of time with steady supply and without any expected severe event, the purchase data 42 for most supplies may indicate steady purchases. However, as the severe event approaches, the purchase data 42 is likely to indicate that purchases of many types of supplies (e.g., food, water, gasoline) increase sharply (e.g., purchase rate increases to exceed a threshold) and then decrease (e.g., to zero). The decrease likely occurs because the severe event has reached the one or more geographic locations and/or because the supplies are no longer available (e.g., the users have purchased all of the supplies, and the store has not replenished the supplies most likely due to the severe event preventing trucks and planes from reaching the one or more geographic locations). Thus, if the data indicates that the severe event is not currently at the one or more geographic locations, and the purchase data indicates that there is no purchase of gasoline from one or more gas stations in the one or more geographic locations (e.g., for a period of time, such as over 0.5, 1, or 2 hours; particularly after a sharp increase in the purchase of gasoline from the one or more gas stations), then the computing system 12 may determine that the one or more gas stations are depleted of gasoline. The computing system 12 may also determine that tanks at the one or more gas stations have been refilled if purchases begin again after determining that the one or more gas stations are depleted of gasoline.

In some embodiments, the computing system 12 may count a number of purchases and/or calculate a total dollar amount of the purchases at one or more of the gas stations over time (e.g., over 0.5, 1, 2, or 24 hours). The computing system 12 may then use one or more algorithms to predict a time at which the one or more gas stations will run out of gasoline based on the number of purchases and/or the total dollar amount of the purchases at the one or more of the gas stations over time. In some cases, the computing system 12 may also know or estimate a refill time at which tanks at the one or more gas stations were filled (e.g., the refill time is the time at which purchases begin again after determining that the one or more gas stations are depleted of gasoline), and the computing system 12 may utilize the refill time to predict the time at which the one or more gas stations will run out gasoline (e.g., again run out of gasoline). The computing system 12 may also access and rely on historical data, such as historical data that indicates a number of purchases over time and/or the total dollar amount of the purchases that resulted in the one or more gas stations, or other similar gas stations, running out of gasoline. The computing system 12 may additionally or alternatively access and rely on historical data that indicates how the number of purchases has changed in advance of, during, and/or after severe events (e.g., one or more severe events that are similar to a current severe event). For example, the computing system 12 may predict that the one or more gas stations will not run out of gasoline because, based on the historical data, the number or purchases slows down in the hour prior to the beginning of the severe event. In some embodiments, the computing system 12 may also consider purchases at surrounding local stores or data from stores that appear to be on a path to the user locality, including surrounding gas stations. For example, the computing system 12 may determine that the gas station is out of gasoline because the purchases have decreased to zero even while other purchases continue at the surrounding local stores.

Similar techniques may apply to other types of supplies, such as food and groceries; however, the purchase data 42 from trips to the grocery stores may show that the purchases decrease in amount (e.g., because several items are unavailable) and/or number (e.g., some users leave the stores without buying anything). In such cases, the purchase data 42 may provide a general indication of how well stocked the grocery stores are at the current time, but does not necessarily provide information about particular types of items (e.g., milk, break) unless the purchase data 42 is provided to the computing system 12 with this level of detail. However, the computing system 12 may use the purchase data 42, as well as historical data and/or various algorithms, to determine and/or to predict when the grocery stores will be out of stock of the particular types of items. For example, the historical data may show that the grocery stores are likely (e.g., 90 or 100 percent chance) to be out of milk once the purchase data 42 begins to decrease after the increase in advance of severe events. The computing system 12 may also use the purchase data 42 to recommend one store/gas station over another store/gas station (e.g., a store that is in beginning stages of the increase in purchases instead of another store that is at later stages of the increase in purchases or has already entered into the decrease in purchases).

The one or more drones 34 may provide the drone data 44. The one or more drones 34 may be associated with an owner, such as an insurance company and/or banking company. The one or more drones 34 may be a multi rotor drone, a fixed wing drone, a single rotor helicopter drone, a fixed wing hybrid VTOL (vertical take-off and landing) drone, or the like. In some embodiments, the one or more drones 34 may include an unmanned vehicle (i.e., a UAV); however, certain systems and techniques may utilized manned vehicles and/or other sensors (e.g., as mentioned herein, sensors that are affixed to structures and/or that are part of the one or more user devices 38 may collect sensor data, such as images).

The one or more drones 34 may contain a camera that is configured to take images (e.g., still and/or moving images) of its surroundings. For example, the one or more drones 34 and/or other sensors may obtain images of store shelves while traveling through a store, and the images may be provided as the drone data 44 and/or the sensor data to the computing system 12. Then, the computing system 12 may analyze the drone data 44 and/or the sensor data to determine and/or to predict occurrence of the supply chain shortage. For example, the computing system 12 may use one or more algorithms (e.g., machine learning or artificial intelligence algorithms) to analyze one or more images and to determine an amount of an item that is in stock at the store. It should be appreciated that the computing system 12 may analyze the purchase data 42 and the images together to determine and/or predict the occurrence of the supply chain shortage. Furthermore, the computing system 12 may use the purchase data 42 to prompt travel of the drone 34 to the store and/or use or access to the sensors at the store. For example, in response to the purchase data 42 for the store indicating a change (e.g., an increase or a decrease) in purchases at the store, the computing system 12 may instruct the drone 34 to the travel to the store to obtain images that provide more information about the supply levels at the merchant.

In addition to or instead of direct imaging of supplies (e.g., on the store shelves), the one or more drones 34 may obtain images of roadways (e.g., rail, airports, ports), store parking lots, and/or gas stations. The images of the roadways, the store parking lots, and/or the gas stations may be indicative of a supply chain shortage and/or enable the computing system 12 to determine and/or to predict the occurrence of the supply chain shortage. For example, the one or more drones 34 may take images of gas stations and send the images as the drone data 44 to the computing system 12. Then, the computing system 12 may count a number of vehicles at one or more of the gas stations over time (e.g., over 0.5, 1, 2, or 24 hours). The computing system 12 may then use one or more algorithms to predict a time at which the one or more gas stations will run out of gasoline based on the number of vehicles at the one or more of the gas stations over time. The computing system 12 may access and rely on historical data, such as historical data that indicates a number of vehicles over time that resulted in the one or more gas stations, or other similar gas stations, running out of gasoline. The computing system 12 may additionally or alternatively access and rely on historical data that indicates how the number of vehicles has changed in advance of, during, and/or after severe events (e.g., one or more severe events that are similar to a current severe event). In some embodiments, the computing system 12 may determine that the one or more gas stations are out of gasoline when the images indicate that no vehicles are at the one or more gas stations, particularly if vehicles are still traveling on roadways and/or visiting other nearby gas stations.

It should be appreciated that the computing system 12 may analyze the various types of data described herein together to determine and/or to predict the occurrence of the supply chain shortage. For example, if the drone data 44 indicates that one or more vehicles stopped at a particular one of the gas stations and there is no corresponding payment card data available through the banking service 32, the computing system 12 may determine that the gas station is out of gasoline. Because some users may pay with other forms of payment (other than payment cards), the computing system 12 may determine that the gas station is out of gasoline only after multiple vehicles (e.g., more than a threshold, such as more than 2, 5, 10, 50, or 100 vehicles) stop at the gas station without receipt of any corresponding payment card data from the banking service 32. Similarly, if the drone data 44 indicates multiple vehicles at the gas station (e.g., lined up) and/or corresponding payment card data available from the banking service 32, the computing system 12 may determine that the gas station has gasoline. The drone data 44 may also include images that show tanker trucks on the roadways in the vicinity of the gas station and/or at the gas station, and the computing system 12 may consider the presence of the tanker trucks in combination with the number of vehicles at the gas station and/or the purchase data 42 from the gas station to determine whether gasoline is available at the gas station. Furthermore, the computing system 12 may use the purchase data 42 to prompt travel of the drone 34 to the gas station. For example, in response to the purchase data 42 for the gas station indicating a change (e.g., an increase or a decrease) in purchases at the gas station, the computing system 12 may instruct the drone 34 to the travel to the gas station to obtain images that provide more information about the supply levels at the gas station.

In certain embodiments, the computing system 12 may be configured to determine and/or to predict the occurrence of the supply chain shortage without any input of information from any stores or suppliers (e.g., that make, supply, and/or sell the items; only using the drone data 44 from the one or more drones 34 and/or purchase data 42 from the banking service 32). However, in some cases, the one or more local stores 36 may provide the pricing data 46 and/or the supply data 48 to the computing system 12. The one or more local stores 36 may be supermarkets, grocery stores, gas stations, or the like. The one or more local stores 36 may be within a certain distance of the first user device 38. In some embodiments, the one or more local stores 36 may send the pricing data 46 and/or the supply data 48 to the computing system 12 in real time. The pricing data 46 may contain an amount of stock of one or more items available at the one or more local stores 36. Likewise, the pricing data 46 may contain one or prices pertaining to one or more items available at the one or more local stores 36. In some embodiments, the pricing data 46 may also contain one or more rates of pricing, and the supply data 48 may also contain one more rates of supply. That is, the pricing data 46 may indicate how one or more prices of one or more certain items have changed over a certain amount of time, and the supply data 48 may indicate how one or more stocks of one or more certain items have changed over a certain amount of time. In some embodiments, the pricing data 46 and/or the supply data 48 may additionally or alternatively be provided by users via the user devices 38 (e.g., crowdsourced; input by the users via the software application 60 running on the user devices 38).

In some embodiments, the system 10 may be used to facilitate interactions between users. In such cases, the second user device 38 may send the user availability data 50 to the computing system 12. The user availability data 50 may indicate an availability of the supplier user of the second user device 38 to deliver items, the distance of the second user device 38 from the first user device 38, what items the supplier user of the second user device 38 is available to share, and the like. It is important to note that multiple supplier users may use their own user devices 38 to provide their respective user availability data 50. In this way, the computing system 12 may be able to assemble a comprehensive list of multiple supplier users who are available to deliver or provide supplies to other users, such as to a recipient user with the first user device 38. Further details about user-to-user interaction are provided in the discussion of FIG. 5.

The computing system 12 may use the data (e.g., the weather data 40, the purchase data 42, the drone data 44, the pricing data 46, the supply data 48, and/or the user availability data 50) received from the network 26 to determine and/or to predict occurrence of a supply chain shortage associated with a severe event. That is, the computing system 12 may analyze the data independently or in combination as to make said determination. As mentioned herein, in some embodiments the computing system 12 may use algorithms (e.g., machine learning or artificial intelligence algorithms) to analyze the data, determine and/or to predict occurrence of a supply chain shortage associated with a severe event, and/or to generate an output 52. In some embodiments, the output 52 may be a notification that contains information, such as when the severe event is likely to happen, where to obtain supplies that are in shortage, and the like. Then, the output 52 may be sent to the one or more user devices 38 (e.g., to the first user device 38; the computing system 12 may instruct output of the notification) via the network 26. The one or more user devices 38 may have the software application 60 associated with the system 10. The one or more user devices 38 may receive the output 52, which may contain information relating to the severe event, the availability of items, and/or the availability of supplier users. Then, the software application 60 may parse the output 52 to present relevant information to the users on the one or more user devices 38 (e.g., on the first user device 38).

In some embodiments, the computing system 12 may use the data to determine whether an allowable purchase limit (e.g., daily purchase limit and/or a total credit limit) and/or an annular percentage rate (APR) should be adjusted (e.g., increased and decreased, respectively) at least for a period of time and at least for certain items, certain types of items, and/or certain stores. For example, the period of time may be 2, 3, 4, 5, 6, 7, or more days, and the period of time may include at least some days prior to the severe weather event, at least some days during the severe weather event, and/or at least some days after the severe weather event. The adjustments to the allowable purchase limit and/or the APR may apply to generators, gasoline, food, water, and/or building supplies. As another example, the adjustments to the allowable purchase limit and/or the APR may apply to generator supply stores, gas stations, grocery stores, and/or building supply stores. The adjustments may apply across all users (e.g., increase by a flat amount, such as 2,000 dollars; increase by a set percentage, such as 10 percent; increase by a set percentage, such as 10 percent with a cap of 5,000 dollars) or may be personalized for certain users or groups of similar users (e.g., based on credit scores). For example, some users with higher credit scores may receive a larger increase (e.g., by a flat amount of 2,000 dollars; increase by a set percentage of 10 percent) to their allowable purchase limit, and other users with lower credit scores may receive a smaller increase (e.g., to a flat amount of 2,000 dollars; increase by a set percentage of 5 percent) to their allowable purchase limit.

In such cases, the output 52 may indicate the adjustment to the allowable purchase limit and/or the APR. For example, the output 52 may instruct display of the adjustment to the allowable purchase limit, the allowable purchase limit, the adjustment to the APR, and/or the APR (e.g., via the user device 38). In some embodiments, the output 52 may include a recommendation and/or an instruction that is transmitted over the network 26 to the banking service 32 or any other suitable service. Then, in response to receipt of confirmation from the banking service 32 that the adjustment to the allowable purchase limit and/or the APR has been authorized and implemented, the computing system 12 may provide the output 52 to instruct the display of the adjustment to the allowable purchase limit and/or APR.

Figure 2:
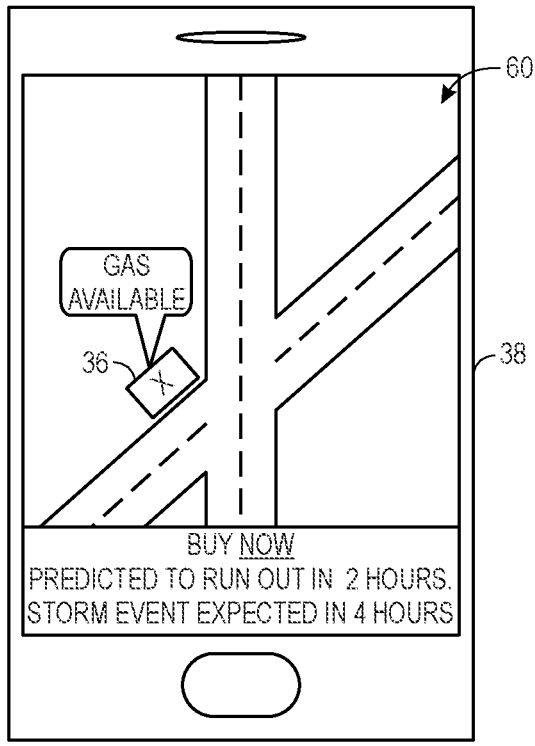
FIG. 2 illustrates a graphical user interface that displays a notification generated by the system of FIG. 1, wherein the notification provides a prediction of a time at which supplies will become unavailable, in accordance with an embodiment described herein.

FIG. 2 illustrates an embodiment of a graphical user interface that displays a notification generated by the system 10, wherein the notification provides a prediction of a time at which the supplies will become unavailable. Specifically, the notification is presented (e.g., via the software application 60) on the first user device 38, and the notification indicates a local store 36 with one or more supplies available for purchase, and the expected price (e.g., in case cash is required) and quantity available (e.g., limited, unlimited, known limits). For example, the local store 36 is a gas station with gasoline available for purchase.

In order to generate and to provide the notification of FIG. 2, the computing system 12 analyzes the data from the multiple data sources described herein to determine and/or to predict that the gas station currently has gasoline available for purchase. Furthermore, the computing system 12 may analyze the data from the multiple data sources to predict (e.g., estimate) how long the gas will last at the gas station (e.g., at time at which the gas station will run out of gasoline).

The software application 60 may parse the output 52 in order to display relevant information to the user via the display of the first user device 38. Such relevant information may include, but is not necessarily limited to, a location of the local store 36, the item(s) available at the local store 36, the location of the local store 36 on a map, an estimated amount of time until the item(s) run out of stock, and a recommendation for the user (e.g., a recommendation to "buy now" or a recommendation to buy prior to a particular time), as shown in FIG. 2. In some embodiments, the map may be retrieved from a map application that is stored in the first user device 38, a map service via the network 26, or the like.

Figure 3:
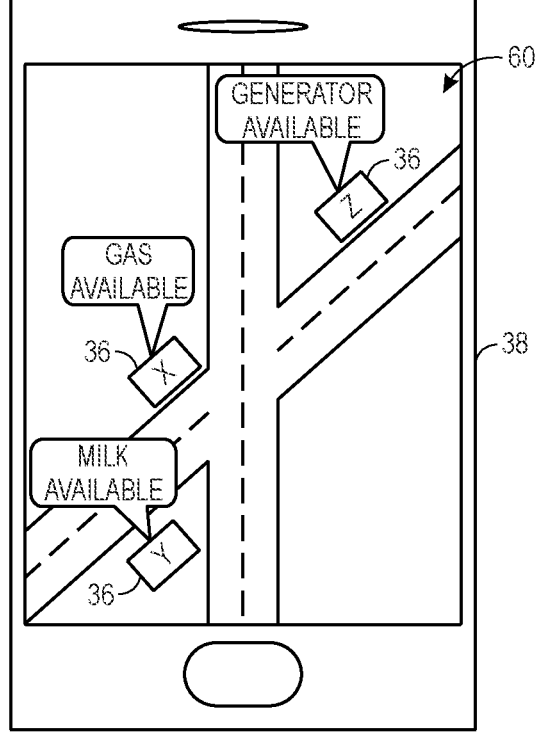
FIG. 3 illustrates a graphical user interface that displays a notification generated by the system of FIG. 1, wherein the notification provides a map of one or more locations that have supplies available, in accordance with an embodiment described herein.

FIG. 3 illustrates an embodiment of a graphical user interface that displays a notification generated by the system 10, wherein the notification provides a map of one or more locations that have supplies available. As shown, the output 52 may contain information about multiple local stores 36 within a certain geographical area. In some embodiments, the certain geographical area may be an area within a certain distance (e.g., radius) of the first user device 38, or the certain geographical area may be a requested geographical area (e.g., requested by the user; not necessarily near the first user device 38). The geographical area might represent a path of spreading shortages. The first user device 38 may receive the output 52 via the network 26, and the software application 60 may parse the output 52 to display relevant information on the first user device 38. Here, the multiple local stores 36 may be shown on a map of the software application 60. The software application 60 may display what item(s) are available at each local store 36. In some embodiments, each local store 36 may be associated with a corresponding list which details multiple items that are available at each local store 36. In some embodiments, the list may be displayed upon a digital actuation of a visual representation of the local store 36, such as via a touch on a touchscreen of the first user device 38.

Figure 4:
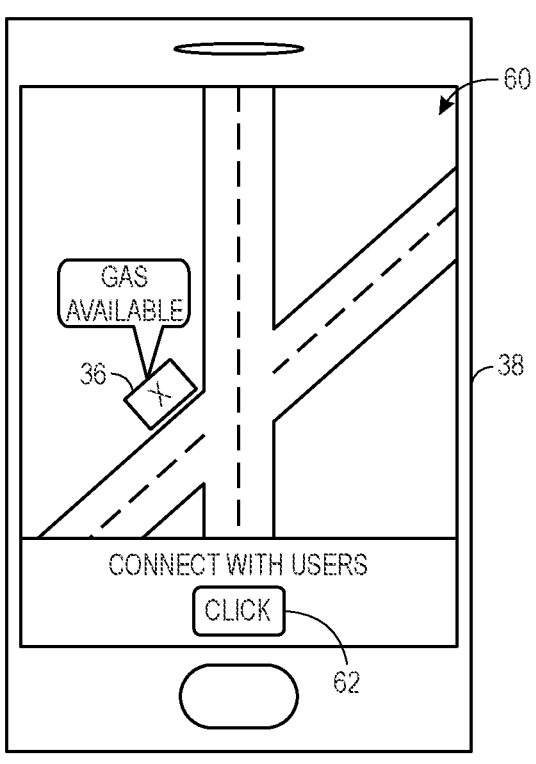
FIG. 4 illustrates a graphical user interface that displays a notification generated by the system of FIG. 1, wherein the notification provides a link to connect with users, in accordance with an embodiment described herein.

FIG. 4 illustrates an embodiment of a graphical user interface that displays a notification generated by the system 10, wherein the notification provides a link to connect with users. In FIG. 2 and FIG. 3, the software application 60 showcased one or more local stores 36 that had one or more items in stock. However, FIG. 4 illustrates the software application 60 displaying a local store 36 (e.g., a gasoline station) that does not have one or more items (e.g., gasoline) in stock. In addition, the software application 60 may facilitate an interaction between a recipient user of the first user device 38 and a supplier user of the second user device 38. For example, the software application 60 may display a digital button 62 that, when selected or touched, may connect the recipient user with the supplier user. In some embodiments, the digital button 62 may be displayed after one or more conditions are met. For example, the digital button 62 may be displayed in response to the system 10 determining that there are no stores in a geographical area (e.g., within a particular range close to the first user device 38) that have a particular item in stock.

Figure 5:
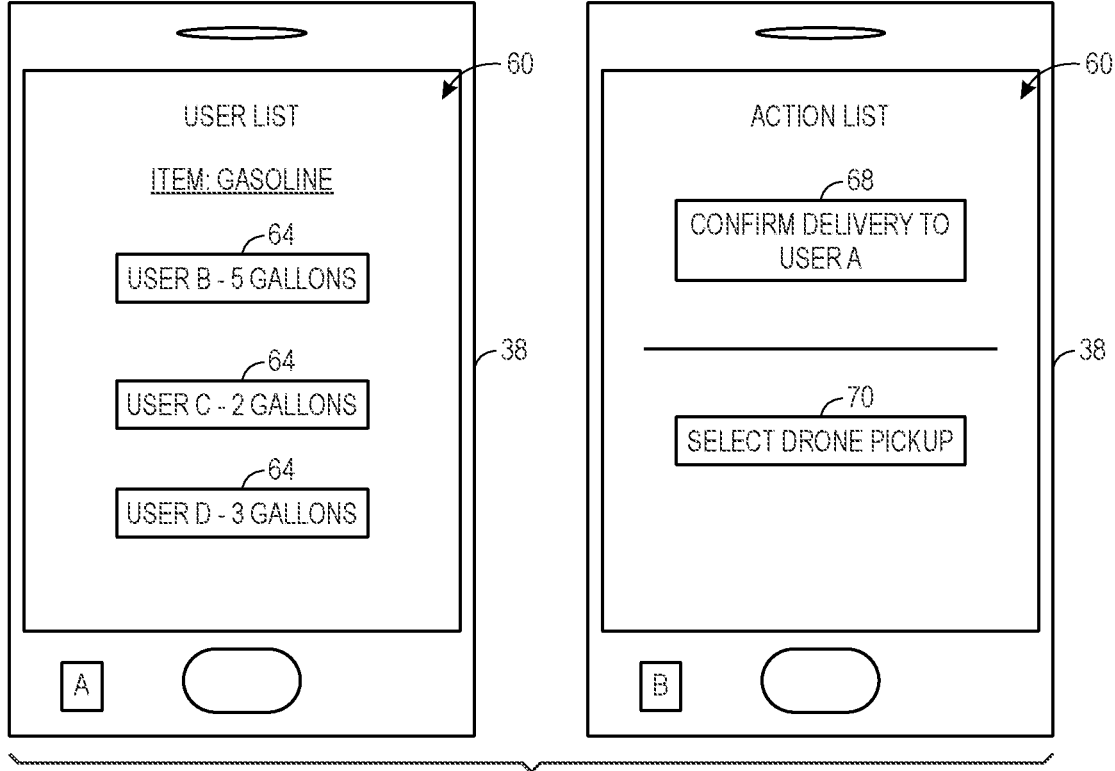
FIG. 5 illustrates graphical user interfaces that display notifications generated by the system of FIG. 1, wherein the notifications facilitate communication and assistance between users, in accordance with an embodiment described herein.

FIG. 5 illustrates graphical user interfaces that display notifications generated by the system 10, wherein the notifications facilitate communication and assistance between users. As shown, the first user device 38 may present a user list page (e.g., in response to digital actuation of the digital button 62). The user list may display one or more supplier users 64 who are available to deliver or to provide (e.g., the user retrieves the supplies from the supplier) supplies to the recipient user of the first user device 38. The one or more supplier users 64 may have access to one or more particular items (e.g., gasoline, food, water) and/or may be a certain distance or time from the first user device 38. Indeed, in some embodiments the recipient user may filter the one or more supplier users 64 by items, distance, or a combination thereof. Then, the recipient user may select one or more of the supplier users 64 from the user list, such as via a digital actuation of a respective virtual button representative of each of the one or more supplier users 64.

In some embodiments, upon selection of the one or more supplier users 64, the first user device 38 may send a confirmation of the selection to the computing system 12. The computing system 12 may, via the network 26, send the output 52 (e.g., the notification) to the one or more second user devices 38 containing a message that the supplier user 64 has been selected. In some embodiments, upon selection of the one or more supplier users 64, the first user device 38 may communicate with the second user device 38 through the network 26. For example, the first user device 38 and the second user device 38 may communicate via a messaging system of the software application 60. In some embodiments, the messaging system may be a chat system (e.g., real time chat or text messages). It should be appreciated that the messaging system may be usually locked (e.g., unavailable to the recipient user, the supplier user, or both) and may be unlocked in response to prediction/occurrence of a severe event and/or a supply shortage (e.g., one or more items out of stock around the time of the severe event). For example, in response to prediction of the severe event and prediction that the supply shortage of gasoline is likely to follow, the messaging system to facilitate communication and exchanges between the users may be unlocked (this may even occur in advance of the severe event and/or the supply shortage/out of stock items).

The second user device 38 may present an action list. As an example, FIG. 5 shows the action list with an action 68 and an action 70. The selection of the action 68 may confirm delivery to the recipient user, and the second user device 38 may send the confirmation to the computing system 12 via the network 26. The computing system 12 may then provide another output 52 to the first user device 38 via the network 26 to let the recipient user know that the supplier user will deliver (or has delivered) the supplies and/or other relevant details (e.g., about the supplies, the location, the mode of delivery, directions for the user to retrieve the supplies).

The selection of the action 70 may initiate a drone delivery process in which a drone, such as at least one of the one or more drones 34, may travel to the location of the second user device 38 (or other designated location) to pick up the supplies and then travel to the location of the first user device 38 (or other designated location) to drop off the supplies. For example, upon arrival of the drone 34, the supplier user may attached the requested supplies to the drone 34. Then, the drone 34 may deliver the supplies to the recipient user. The supplier user and/or the recipient user may provide various inputs during the drone delivery process, such as inputs to confirm attachment of the supplies to the drone 34 and/or inputs to confirm receipt of the supplies via the drone 34. In some embodiments, the drone 34 may communicate with the first user device 38 and/or the second user device 38 via the network 26. For example, the drone 34 may transmit its location, its estimated time of arrival, and the like to the first user device 38 and/or to the second user device 38.

Technical effects of the embodiments described herein include aiding users to prepare for severe events. Indeed, the embodiments described herein enable a user to be notified of a severe event ahead of time and to stock up on essential supplies even during supply chain shortages. Moreover, the embodiments described herein facilitate the provision of essential supplies to users, especially from other users willing to deliver supplies or provide access to surplus supplies. Lastly, the embodiments described herein enable organizations, such as an insurance company and/or a banking service, to financially aid users in severe events. It should be appreciated that any of the features disclosed herein may be adapted for use at times of severe events and/or at times without severe events. Furthermore, it should be appreciated that any of the features disclosed herein may be combined in any suitable manner (e.g., features described with reference to gas stations may be used with grocery stores, and vice versa). Additionally, any of the information that may be displayed via the one or more user devices may be combined in any manner (e.g., the expected time of arrival of the severe weather event may be displayed along with the user list and/or the action list). Additionally, it should be appreciated that aspects disclosed herein may be carried out in an automated, coordinated sequence by the computing system 12 without some or all of the inputs from the users that are described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A guidance system, comprising:

one or more processors; and memory storing instructions executable by the one or more processors to cause the one or more processors to:

receive, via a network, data from a plurality of data sources, wherein the data comprises purchase data from a banking service of the plurality of data sources;

identify, based on the data, a forecast of an event for a geographic location associated with the data; and in response to identifying the forecast of the event for the geographic location:

determine, based on identifying a change in the purchase data for the geographic location, an occurrence of one or more supply chain shortages of one or more items associated with the geographic location;

generate and send, based on determining the occurrence of the one or more supply chain shortages and via the network, an output that comprises information associated with the event and the one or more supply chain shortages to a plurality of user devices associated with the geographic location;

parse the output to identify first data based on first location data indicating that a first user device of the plurality of user devices is located within a first area of the geographic location;

parse the output to identify second data based on second location data indicating that a second user device of the plurality of user devices is located within a second area of the geographic location different than the first area;

instruct, via a respective application of the first user device, display of the first data using a first display of the first user device, the first data being indicative of a first location of a first local store within the first area, availability of a first item at the first local store, a first estimated time until the first item runs out of stock at the first local store, a first recommendation, or any combination thereof;

instruct, via a respective application of the second user device, display of the second data using a second display of the second user device, the second data being indicative of a second location of a second local store, availability of a second item at the second local store, a second estimated time until the second item runs out of stock at the second local store, a second recommendation, or any combination thereof;

enable a respective message application on the first user device and on the second user device to facilitate interaction between a first user associated with the first user device and a second user associated with the second user device in response to identifying that the second user has access to the first local store, the first item, or both; and generate instructions to cause a drone delivery process in response to a request for a drone delivery by the first user, wherein the drone delivery process comprises automated operation of at least one drone to travel from a respective location of the second user device determined based on the second location data to a respective location of the first user device determined based on the first location data to deliver the first item from the second user to the first user.

2. The guidance system of claim 1, wherein the data comprises weather data from a weather service of the plurality of data sources.

3. The guidance system of claim 1, wherein the data comprises weather data from a weather service of the plurality of data sources and image data from one or more cameras of the plurality of data sources.

4. The guidance system of claim 3, wherein the instructions are executable by the one or more processors to cause the one or more processors to determine the occurrence of the one or more supply chain shortages of gasoline at one or more gas stations associated with the geographic location based on analysis of the image data that indicates a number of vehicles at the one or more gas stations.

5. The guidance system of claim 1, wherein the instructions are executable by the one or more processors to cause the one or more processors to adjust an annual percentage rate for an account of the first user associated with the first user device in response to identifying the forecast of the event for the geographic location.

6. The guidance system of claim 5, wherein the instructions are executable by the one or more processors to cause the one or more processors to adjust the annual percentage rate for the account of the first user, for only certain types of supplies, certain types of stores, or a combination thereof.

7. The guidance system of claim 1, wherein the data comprises weather data from a weather service of the plurality of data sources and purchase data from a banking service of the plurality of data sources, and the instructions are executable by the one or more processors to cause the one or more processors to:

identify the forecast of the event based on the weather data, wherein the event comprises a weather event;

identify an increase in purchases of the one or more items associated with the geographic location based on the purchase data; and predict the occurrence of the one or more supply chain shortages of the one or more items based on the increase in the purchases.

8. The guidance system of claim 7, wherein the data comprises image data from one or more cameras of the plurality of data sources, and the instructions are executable by the one or more processors to cause the one or more processors to:

instruct the one or more cameras to transmit the image data to the one or more processors in response to the purchase data indicating the increase in purchases; and predict the occurrence of the one or more supply chain shortages of the one or more items based on the increase in purchases and the image data.

9. A method of operating a guidance system, the method comprising:

receiving, at one or more processors, data from a plurality of data sources, wherein the data comprises purchase data from a banking service of the plurality of data sources;

identifying, using the one or more processors and based on the data, a forecast of an event for a geographic location associated with the data;

identifying, using the one or more processors, a change in the purchase data associated with the geographic location;

in response to identifying the change in the purchase data, the forecast of the event for the geographic location, or both:

determining, using the one or more processors and based on identifying the change in the purchase data, an occurrence of one or more supply chain shortages of one or more items associated with the geographic location;

generating and sending, based on determining that occurrence of the one or more supply chain shortages and using the one or more processors, an output that comprises information associated with the event and the one or more supply chain shortages to a plurality of user devices associated with the geographic location;

parsing the output to identify first data based on first location data indicating that a first user device of the plurality of user devices is located within a first area of the geographic location;

parsing the output to identify second data based on second location data indicating that a second user device of the plurality of user devices is located within a second area of the geographic location different than the first area;

instructing, via a respective application of the first user device, display of the first data using a first display of the first user device, the first data being indicative of a first location of a first local store within the first area, availability of a first item at the first local store, a first estimated time until the first item runs out of stock at the first local store, a first recommendation, or any combination thereof;

instructing, via a respective application of the second user device, display of the second data using a second display of the second user device, the second data indicative of a second location of a second local store, availability of a second item at the second local store, a second estimated time until the second item runs out of stock at the second local store, a second recommendation, or any combination thereof;

enabling, using the one or more processors, a respective message application on the first user device and on the second user device to facilitate interaction between a first user associated with the first user device and a second user associated with the second user device in response to identifying that the second user has access to the first local store, the first item, or both; and generating, using the one or more processors, instructions to cause a drone delivery process in response to a request for a drone delivery by the first user, wherein the drone delivery process comprises automated operation of at least one drone to travel from a respective location of the second user device determined based on the second location data to a respective location of the first user device determined based on the first location data to deliver the first item from the second user to the first user.

10. The method of claim 9, comprising adjusting, using the one or more processors, an allowed purchase amount for an account of the first user associated with the first user device, an annual percentage rate for the account of the first user, or a combination thereof in response to identifying the change in the purchase data, the forecast of the event for the geographic location, or both.

11. The method of claim 10, comprising adjusting, using the one or more processors, the allowed purchase amount for the account of the first user, the annual percentage rate for the account of the first user, or the combination thereof for only certain types of supplies, certain types of stores, or a combination thereof.

12. A guidance system, comprising:

one or more processors;

memory storing instructions executable by the one or more processors to cause the one or more processors to:

receive weather data from a weather data source;

receive a geographic location associated with a first user device;

identify, based on the weather data, a forecast of a weather event for the geographic location;

receive additional data from one or more additional data sources, wherein the additional data comprises purchase data from a banking service of the one or more additional data sources;

determine, based on a change in the purchase data for the geographic location, an occurrence of one or more supply chain shortages of one or more items in an area associated with the geographic location;

generate an output indicative of the one or more supply chain shortages;

in response to determining that the one or more items are not available at one or more local stores within the area, instruct display of the output on a display of the first user device, wherein the display of the output comprises a digital button indicative of one or more available suppliers that have availability of the one or more items;

in response to digital actuation of the digital button, instruct display of a list of the one or more available suppliers and one or more respective distances between the one or more available suppliers and the first user device via the display;

in response to a selection of a second user from the list of the one or more available suppliers, enable a respective message application on the first user device and on a second user device to facilitate interaction between a first user associated with the first user device and a second user associated with the second user device; and generate instructions to cause a drone delivery process, wherein the drone delivery process comprises automated operation of at least one drone to travel from a respective location of the second user device to a respective location of the first user device to deliver at least one item of the one or more items from the second user to the first user.

13. The guidance system of claim 12, wherein the instructions are executable by the one or more processors to cause the one or more processors to in response to determining that the one or more items are available at the one or more local stores within the area, generate a map that represents the one or more stores in the area that have the one or more items in stock, and instruct display of an additional indication of the map on the display of the first user device.

14. The guidance system of claim 12, wherein the instructions are executable by the one or more processors to cause the one or more processors to:

predict, based on the purchase data, a future time at which a particular item of the one or more items will be out of stock in the area; and the output comprises an additional indication of the future time and the particular item of the one or more items.

15. The guidance system of claim 1, wherein the instructions are executable by the one or more processors to cause the one or more processors to provide, via a graphical user interface of the respective message application on the first user device, a selectable list of suppliers comprising the second user;

each supplier of the selectable list of suppliers is associated with a commodity available for access by the first user; and the respective message application is configured to unlock communication between the first user device and the second user device in response to a selection of the second user from the selectable list of suppliers.

16. The guidance system of claim 1, wherein the instructions are executable by the one or more processors to cause the one or more processors to predict the occurrence of the one or more supply chain shortages using a machine learning algorithm.

17. The guidance system of claim 1, wherein the instructions are executable by the one or more processors to cause the one or more processors to analyze the purchase data to identify the change in the purchase data for the geographic location based on identifying an increase in a purchase rate of the one or more items at one or more stores exceeding a threshold purchase rate followed by a decrease in the purchase rate of the one or more items at the one or more stores.

* * * * *